2,994,640
ANTI-INFLAMMATORY THERAPY WITH PURINE MOLECULAR COMPOUNDS

Hugo Zellner, Linz (Danube), Austria, assignor to Byk-Gulden Lomberg Chemische Fabrik G.m.b.H., Konstanz (Bodensee), Germany, a corporation of Germany
No Drawing. Filed Feb. 24, 1958, Ser. No. 716,837
Claims priority, application Germany Feb. 22, 1957
3 Claims. (Cl. 167—65)

The present invention relates to new and valuable compounds of the sodium salt of α-naphthyl acetic acid and purine compounds and, more particularly, to new molecular compounds of the sodium salt of α-naphthyl acetic acid and caffeine and theophylline.

It is one object of the present invention to provide such valuable molecular compounds which have proved to be useful in therapy as inflammation inhibiting agents and for other purposes.

Other objects of the present invention and advantageous features thereof will become apparent as the description proceeds.

In principle, the present invention relates to new and valuable molecular compounds of the formula

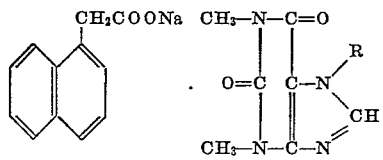

wherein R represents hydrogen or a methyl radical.

Such molecular compounds are obtained by neutralizing α-naphthyl acetic acid with sodium bicarbonate or sodium hydroxide in an aqueous solution and adding the equimolecular amount of the respective purine compound thereto.

The new molecular compounds have the advantage over caffeine and theophylline that they are much better soluble in water than the purines as such. For instance, the molecular compound with caffeine permits the preparation of aqueous solutions containing 80% of the molecular compound.

That new molecular compounds are formed is proved by the uniformity of the crystals, by the behavior of solutions thereof on determining the freezing point depression, and by determining the equilibrium of its distribution between water and organic solvents such as chloroform or a mixture of ether and chloroform.

The new molecular compounds have a number of therapeutical advantages over the purines. For instance, the irritating effect of the purines on the gastric mucous membrane is considerably reduced.

Especially pronounced are the advantages of the molecular compound with caffeine. This compound has a remarkable anti-inflammatory and anti-edematous effect. In contrast to other compounds of similar activity which cause retention of sodium chloride, the new molecular compounds do not show this disadvantage. The tone reducing activity of caffeine on the bronchial muscles is considerably increased in the new molecular compound. Its choleretic activity is also remarkable. When orally administering 200 mg. of the new molecular compound, the increase in bile secretion is about 30%.

The new and valuable molecular compounds are produced by suspending α-naphthyl acetic acid in water and neutralizing the suspension by the addition of sodium bicarbonate or another basic sodium compound. After filtration, the equimolar amount of the purine compound is added. On concentrating the solution, the new molecular compound of sodium α-naphthyl acetate and the purine compound crystallizes.

The following examples serve to illustrate the present invention without, however, limiting the same thereto.

Example 1

186 g. of α-naphthyl acetic acid are suspended in 250 cc. of water at a temperature of 50–60° C. 84 g. of sodium bicarbonate are added thereto while stirring. After filtration, 194 g. of caffeine are added with stirring. The clear solution is concentrated. Thereby, the molecular compound crystallizes.

The new compound has the formula

$$C_{12}H_9O_2Na.C_8H_{10}N_4O_2$$

Example 2

186 g. of α-naphthyl acetic acid are suspended in 250 cc. of water at a temperature of 50–60° C. 84 g. of sodium bicarbonate are added thereto while stirring. If necessary, the solution is filtered. 180 g. of theophylline are added with stirring while maintaining the temperature at 50–60° C.

On concentrating by evaporation the clear solution, the new molecular compound crystallizes. It corresponds to the formula

$$C_{12}H_9O_2Na.C_7H_8N_4O_2$$

As stated above, the new molecular compounds are readily soluble in water so that highly concentrated aqueous solutions of the purines can be prepared. It is surprising that only caffeine and theophylline yield such molecular compounds. They are not formed by theobromine and xanthine.

As stated above, the new molecular compounds have a remarkable anti-inflammatory and antiphlogistic activity. Pharmacological tests have shown, for instance, that edema formation caused by injection of 0.1 cc. of a 1% formaldehyde solution into the dorsal part of the hindpaw of male albino rats, is markedly inhibited by subcutaneous injection of a dilute aqueous solution of the molecular compound.

Of considerable therapeutic importance is also the above mentioned choleretic activity of the new molecular compounds.

These antiphlogistic and choleretic effects of the new compounds permit their application in all instances where a combination of said effects with the effects of caffeine and/or theophylline is desired. Optimum results are achieved when using the substantially pure molecular compounds according to the present invention.

The new crystalline molecular compounds are administered orally in the form of tablets, pills, dragees, and the like shaped preparations or as powders, preferably in capsules. In view of their excellent water solubility, the new compounds can also be administered in the form of solutions in sirups and the like or parenterally in the form of injectable aqueous solutions. The daily dose administered is between about 20 mg. and about 160 mg. of the molecular compound with caffeine and between about 30 mg. and about 150 mg. of the molecular compound with theophylline. The molecular compound with caffeine has proved of value, for instance, in the treatment of cholecystitis.

I claim:
1. The process of suppressing inflammation comprising administering to persons the molecular compound of the sodium salt of α-naphthyl acetic acid and a purine compound, said molecular compound corresponding to the formula

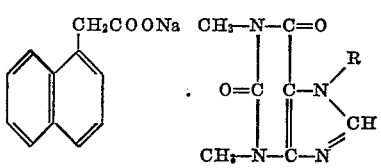

wherein R represents a member selected from the group consisting of hydrogen and the methyl radical in a dose sufficient to cause inhibition of the inflammation.

2. The process of suppressing inflammation comprising administering to persons the molecular compound of 1 mol of the sodium salt of α-naphthyl acetic acid and 1 mol of caffeine in a dose sufficient to cause inhibition of the inflammation.

3. The process of suppressing inflammation comprising administering to persons the molecular compound of 1 mol of the sodium salt of α-naphthyl acetic acid and 1 mol of theophylline in a dose sufficient to cause inhibition of the inflammation.

References Cited in the file of this patent

UNITED STATES PATENTS

| | | |
|---|---|---|
| 2,519,450 | Grote et al. | Aug. 22, 1950 |
| 2,711,409 | Holbert et al. | June 21, 1955 |
| 2,711,411 | Holbert et al. | June 21, 1955 |